United States Patent
Hershey et al.

(10) Patent No.: US 7,471,696 B2
(45) Date of Patent: *Dec. 30, 2008

(54) SYSTEM AND ASSOCIATED METHOD FOR THE SYNCHRONIZATION AND CONTROL OF MULTIPLEXED PAYLOADS OVER A TELECOMMUNICATIONS NETWORK

(75) Inventors: Paul C. Hershey, Ashburn, VA (US); Charles W. K. Gritton, Sterling, VA (US); Jeffrey A. Noel, Spotsylvania, VA (US)

(73) Assignee: Tellabs Operations, Inc., Naperville, IL (US)

( * ) Notice: Subject to any disclaimer, the term of this patent is extended or adjusted under 35 U.S.C. 154(b) by 622 days.

This patent is subject to a terminal disclaimer.

(21) Appl. No.: 10/993,044

(22) Filed: Nov. 19, 2004

(65) Prior Publication Data

US 2005/0074013 A1    Apr. 7, 2005

Related U.S. Application Data

(63) Continuation of application No. 09/748,336, filed on Dec. 22, 2000, now abandoned, and a continuation of application No. 09/017,131, filed on Feb. 2, 1998, now Pat. No. 6,167,062.

(51) Int. Cl.
    *H04J 3/16* (2006.01)
(52) U.S. Cl. .......................... 370/466; 370/503; 370/907
(58) Field of Classification Search .................. None
    See application file for complete search history.

(56) References Cited

U.S. PATENT DOCUMENTS

| | | | |
|---|---|---|---|
| 3,261,920 A | 7/1966 | Aaron | |
| 3,569,631 A | 3/1971 | Johannes et al. | |
| 3,627,946 A | 12/1971 | Inoue et al. | |
| 3,796,835 A | 3/1974 | Closs et al. | |
| 3,985,961 A | 10/1976 | Voss et al. | |
| 3,988,545 A | 10/1976 | Kuemmerle et al. | |
| 3,989,892 A | 11/1976 | Yoshida et al. | |
| 4,099,028 A | 7/1978 | Towson, IV | |
| 4,156,796 A | 5/1979 | O'Neal et al. | |
| 4,353,128 A | 10/1982 | Cummiskey | |

(Continued)

Primary Examiner—Firmin Backer
Assistant Examiner—Phuongchau B Nguyen
(74) Attorney, Agent, or Firm—Hamilton, Brook, Smith & Reynolds, P.C.

(57) ABSTRACT

A system and associated method for the synchronization and control of multiplexed payloads over a telecommunications network wherein the asynchronous timing relationships between multiplexed payloads having varied points of origin are retained subsequent to signal processing of the payloads for further transmission to a destination point. System modules 22 include a network interface section 30, a synchronization, multiplexing and control (SMC) section 50, and a processing section 110. The SMC section 50 includes network interface bus circuitry, payload segmentation and reassembly circuitry, control and management memory and related circuitry, payload re-assembly circuitry, and processor bus interface circuitry. The processing section of module 22 provides means for data compression, echo cancellation, error correction coding, or voice and data encryption/decryption. The module 22 is dynamically configured through a software management and control interface. The software permits dynamic loading of module 22 control logic and provides inband interpretation of performance statistics. Differing sets of control parameters are supplied to the module 22 as dictated by the interpretation of network performance parameters, or through operator supplied modifications. Operator modifications are preferably facilitated through an attached GUI (Graphical User Interface) and associated input devices such as a keyboard and/or mouse.

20 Claims, 7 Drawing Sheets

U.S. PATENT DOCUMENTS

| | | | |
|---|---|---|---|
| 4,542,504 A | 9/1985 | Moul et al. | |
| 4,667,324 A * | 5/1987 | Graves | 370/505 |
| 4,759,014 A | 7/1988 | Decker et al. | |
| 4,958,344 A | 9/1990 | Scott | |
| 4,967,410 A | 10/1990 | Takase et al. | |
| 4,987,572 A | 1/1991 | Scott | |
| 5,122,399 A | 6/1992 | Farrell et al. | |
| 5,267,263 A | 11/1993 | Feezel et al. | |
| 5,428,609 A * | 6/1995 | Eng et al. | 370/466 |
| 5,548,587 A * | 8/1996 | Bailey et al. | 370/395.7 |
| 5,623,491 A * | 4/1997 | Skoog | 370/466 |
| 5,784,377 A | 7/1998 | Baydar et al. | |
| 5,809,021 A * | 9/1998 | Diaz et al. | 370/364 |
| 5,841,771 A * | 11/1998 | Irwin et al. | 370/375 |
| 5,933,426 A * | 8/1999 | Motoori | 370/466 |
| 6,011,802 A | 1/2000 | Norman | |
| 6,167,062 A * | 12/2000 | Hershey et al. | 370/503 |

* cited by examiner

SYSTEM AND ASSOCIATED METHOD FOR THE SYNCHRONIZATION AND CONTROL OF MULTIPLEXED PAYLOADS OVER A TELECOMMUNICATIONS NETWORK

RELATED APPLICATIONS

This application is a Continuation of the following U.S. applications: Ser. No. 09/017,131, filed on Feb. 2, 1998 now U.S. Pat. No. 6,167,062, and Ser. No. 09/748,336, filed on Dec. 22, 2000 now abandoned.

FIELD OF THE INVENTION

This invention relates to telecommunications networks. More specifically, this invention relates to a system and method for the synchronization and control of multiplexed synchronous signals wherein the timing relationships among embedded asynchronous payloads of the synchronous signals are retained subsequent to signal processing.

BACKGROUND OF THE INVENTION

Contemporary telecommunication systems often employ a variety of network layer protocols, physical interfaces, and physical transmission mediums to facilitate communication between remotely located telecommunication network stations. The transmission and management of these multi-protocol signals is traditionally facilitated by the multiplexing of electronic signals into standard digital hierarchies such as the North American Hierarchy (DS1, DS1C, DS2 and DS3) as well as E-1 (European standard) and ATM, or in LAN environments Token Ring, Ethernet and FDDI (Fiber Distributed Data Interface) formats. However, as telecommunication system operators seek reduction in system costs and increased system performance, telecommunication protocols utilizing high bandwidth digital multiplexing formats for the transmission of data are increasingly preferred.

High bandwidth multiplexing protocols such as SONET, Synchronous Optical Network, and SDH, Synchronous Digital Hierarchy, multiplex and transmit tributary signals across a synchronous network via high bandwidth physical media. SONET and SDH employ their own unique digital multiplexing hierarchy which support various communication rates for the transport of multiplexed payloads.

For example, the SONET hierarchy is based on a modular signal, referred to as STS-1,having a 51.840 Mbps communication rate. A tributary signal such as DS3 with a line rate of 44.736 Mbps is assembled into a synchronous signal envelope (STS-1 format) by a process known as payload mapping. The essence of the mapping process is to synchronize the tributary signal with the envelope capacity provided for transport. This is achieved by adding extra stuffing bits (also called justification bits) to the STS-1 signal bit stream as part of the mapping process. For example, a DS3 tributary signal at a nominal rate of 44 Mbps needs to be synchronized with an envelope capacity of 51.840 Mbps (minus STS path overhead). In such manner an, asynchronous low bandwidth payload is embedded within a high bandwidth multiplexed synchronous signal.

The low bandwidth asynchronous payloads are usually processed according to a desired signal processing algorithm for facilitating such functions as data compression, echo cancellation, error correction coding, and voice and data encryption/decryption. Before the present invention was made, it was not easy to reliably retrieve the asynchronous timing relationships between individual payloads subsequent to the signal processing function.

The system in accordance with the present invention processes the asynchronous payloads embedded within synchronous signal envelopes by such communication protocols as SONET and SDH. The retention of timing relationships is maintained by de-multiplexing the asynchronous payloads, synchronizing the asynchronous payloads for processing, processing the asynchronous payloads according to a desired signal conditioning algorithm, and then reassembling the asynchronous payloads to their original embedded format with the original timing relationships.

SUMMARY OF THE INVENTION

A system and associated method are provided for the synchronization and control of multiplexed payloads over a telecommunications network. System modules are provided for connection to a telecommunications network. The modules demultiplex asynchronous payloads of synchronous network signals, synchronize them, process them, and then restore their asynchronous timing relationships.

The modules enable the processing of asynchronous payloads such that the timing relationships between the multiplexed payloads are retrievable subsequent to signal processing of the payloads. System modules include a network interface section, a synchronization, multiplexing and control (SMC) section, and a signal processing section. The SMC section includes network interface bus circuitry, payload segmentation and re-assembly circuitry, control and management memory and related circuitry, payload re-assembly circuitry, and processor bus interface circuitry. The processing section of the modules includes means for data compression, echo cancellation, error correction coding, or voice and data encryption/decryption.

The module is dynamically configured through a software management and control interface. The software permits dynamic loading of module control logic and provides inband interpretation of performance statistics. Differing sets of control parameters are supplied to the module as dictated by the interpretation of network performance parameters, or through operator supplied modifications. Operator modifications are preferably facilitated through an attached GUI (Graphical User Interface) and associated input devices such as a keyboard and/or mouse.

BRIEF DESCRIPTION OF THE DRAWINGS

The foregoing summary, and the following detailed description, will be best understood when read in conjunction with the attached drawings, in which:

FIG. 3a is a schematic diagram of the framer stage 56 of the SMC shown in FIG. 2;

FIG. 3b is a schematic diagram of the fast clock of the framer stage shown in FIG. 3a;

DETAILED DESCRIPTION OF THE PREFERRED EMBODIMENT

The present invention provides a telecommunications system and associated method for retaining the timing relationships between individual, asynchronous payloads, having possibly different points of origin. The method disclosed herein retains these timing relationships during the multiplexing of payloads together, transporting them over a communication medium to a destination point, demultiplexing them at the destination point, and processing them according to a desired signal processing algorithm. Similarly, the invention retains timing information for individually processed payloads which are reassembled and multiplexed for transmission through a new, possibly different communications medium, for transport onto another destination point.

A Synchronization, Multiplexing and Control circuit (SMC) is provided for connection between an appropriate network interface and signal processor circuit. Specifically, a dynamically configured SMC circuit is responsive to inputs at an electrically connected network interface. The SMC circuitry includes network interface bus circuitry, payload segmentation and re-assembly circuitry, control and management memory and related circuitry, payload re-assembly circuitry, and processor bus interface circuitry. The SMC circuit is connected to a processor circuit which includes means for data compression, echo cancellation, error correction coding, voice and data encryption/decryption or combinations thereof, of asynchronous payload signals.

The SMC circuit permits integration of combinations of the network interface circuit and the processor circuit through software driven control provided by a network management interface. SMC performance and network inputs are monitored via a software implemented Telecommunications Network Management and Control System. The software permits dynamic loading of SMC control logic and provides inband interpretation of performance statistics.

Differing sets of control parameters are supplied to the SMC as dictated by the interpretation of network performance parameters, or through operator supplied modifications. Operator modifications are preferably facilitated through an attached GUI (Graphical User Interface) and associated input devices such as a keyboard and/or mouse.

A preferred embodiment of the system and method in accordance with the present invention will now be described with reference to the enumerated drawing figures.

Figure 1:
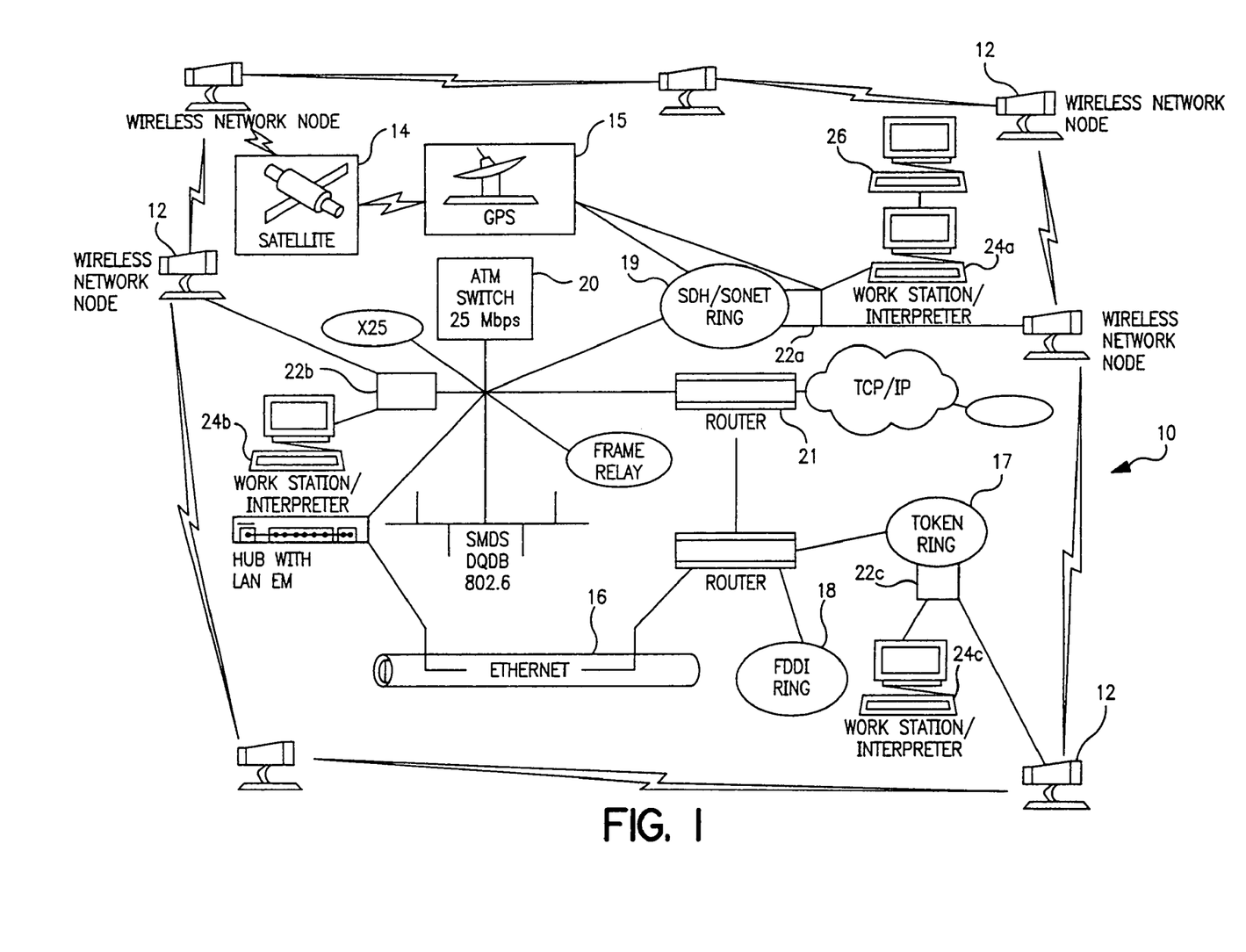
FIG. 1 is a schematic diagram showing a multi-technology network that utilizes the synchronization, multiplexing, and control hardware and network management and control system software in accordance with the present invention.

Referring now to FIG. 1, there is shown a multi-technology telecommunications network 10 of the type to which the present invention is directed. The network 10 is composed of a plurality of sub-networks or subsystems associated with a variety of network technologies. As shown in FIG. 1, network 10 includes a wireless network 12 such as a personal communications network, and a satellite communication network 14 including a global positioning system (GPS) 15. Network 10 also includes various wireline technologies such as local area networks (LAN's) and wide area networks (WAN's), incorporating an Ethernet 16, token ring 17, and/or native mode LAN interconnection (not shown), a fiber distributed data interface ring (FDDI) 18, and one or more broadband network systems 19 such as a synchronous optical network (SONET) and/or a network based on the synchronous digital hierarchy (SDH). Network 10 may additionally employ data routing devices such as an asynchronous transfer mode (ATM) switch 20 or a router 21.

Management Observation and Response System

The software for the network management and control interface provides integration of combinations of network interface circuitry and signal processing circuitry of synchronization, multiplexing, and control modules 22a, 22b, and 22c. The modules, generally referred to collectively by reference numeral 22, are strategically located throughout the telecommunications network 10 to provide the synchronization and control of multiplexed payloads requiring signal processing. Synchronization, multiplexing, and control modules 22 are operably linked to the software driven network monitoring and management system through interpreter workstations 24a, 24b and 24c respectively, the workstations are collectively referred to by reference numeral 24. The software driven management and control system is disclosed in co-pending application Ser. No. 08/714,865 which is incorporated herein by reference. The network management and control interface provides dynamic module configurability in response to changing network conditions. Additionally, network 10 may also include probes (not shown) responsive to changing network parameters for placement within such devices as echo cancelers, routers, ATM switches, gateway devices, Ethernet hubs, or any other type of device which is usually present in the network hardware and has access to data transfer activities on the network. The probes and modules 22 are programmable by the network management and control system, including hardware and software programmability to vary network configurations and utilization of the network.

Synchronization, multiplexing, and control modules 22 include network management protocols to enable communication with workstations 24 over the telephone network via modem, over a LAN or WAN, or other network configuration. A real time operating system is used in conjunction with the appropriate network protocol software and the management protocol software to provide for real time processing of the desired information. The workstations 24 are associated with synchronization, multiplexing, and control modules 22 and probes (not shown). The workstations 24 are programmable to communicate with one or more of the modules 22 or probes. The workstations 24 operate under control of a graphical user interface which permits a system operator to manage, control and configure the synchronization and multiplexing system modules 22 as well as the network probes.

The SMC Module

I. Network Interface Section

Figure 2:
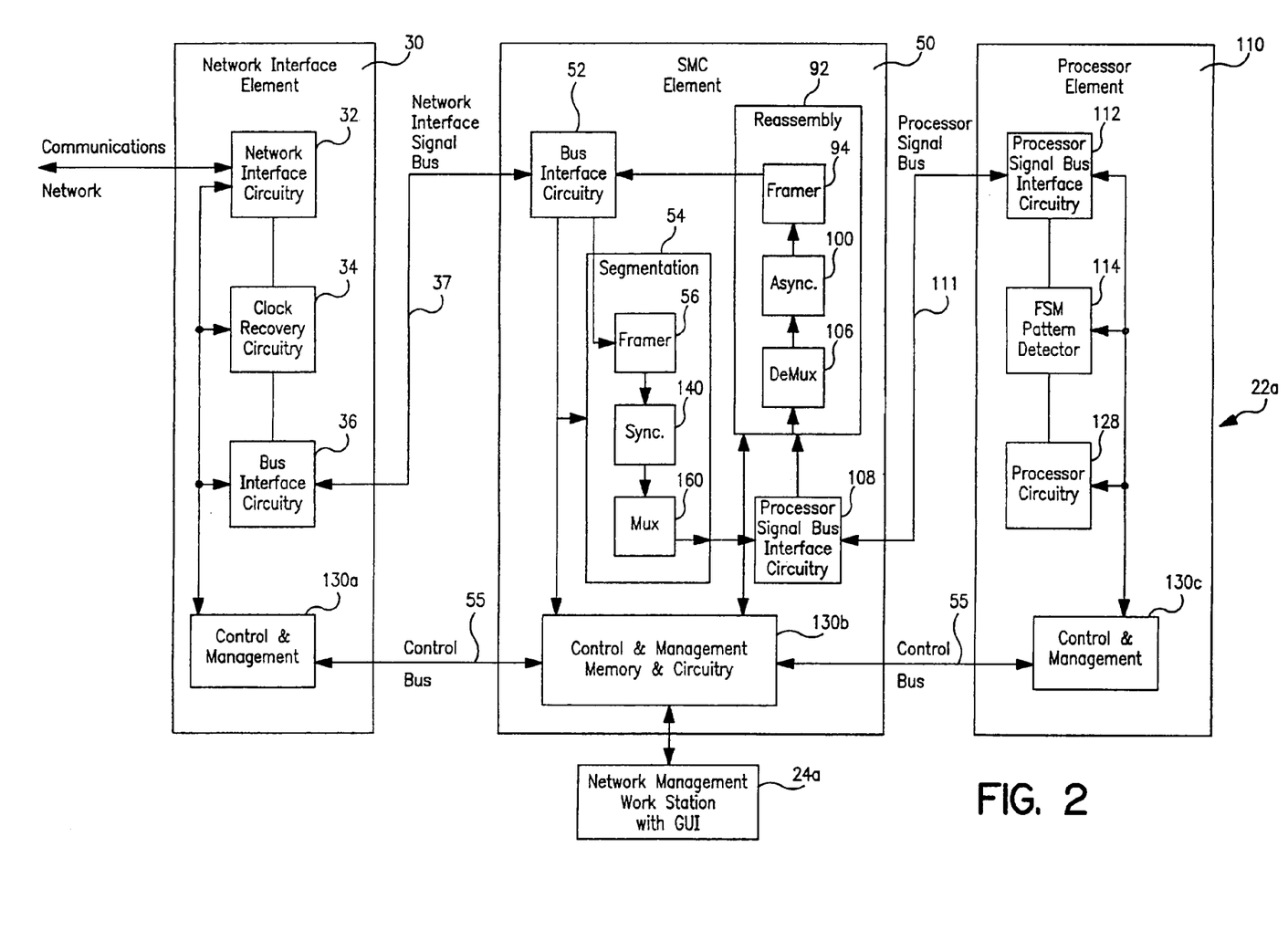
FIG. 2 is a block diagram of a synchronization, multiplexing and control module (SMC) in accordance with the present invention.

Referring now to FIG. 2, a block diagram of a synchronization, multiplexing, and control module 22 are shown. The module includes a network interface section 30, a synchronization, multiplexing and control (SMC) section 50, and a processing section 110. The module 22 connects to the communications network 10 through the network interface 30. Examples of the network interface section include physical interfaces for SONET, SDH, ATM, FDDI, Token Ring, Ethernet, T3, E3, T1, F1, or wireless Personal Communication Service (PCS). The network interface section 30 additionally includes a physical interface to the communications network such as a BNC connection or fiber optic connector, the appropriate interface circuitry 32, clock recovery circuitry 34, network interface bus interface circuitry 36, and control and management memory and circuitry 130a. The control and management memory and circuitry module 130a includes programmable hardware such as Field Programmable Gate Arrays (FPGA) which permit dynamic configuration of the network interface section 30 in accordance with network performance parameters, or through operator supplied modifications. In this way, the architecture of the network interface board is not limited by either the network protocol or the physical connection, but is reconfigurable through the control and management memory and circuitry 130a. However, the embodiment of this architecture is dependent on the components selected for implementation. These components could be specific for a given protocol. For example, the interface card my have BNC connectors for T1 and E1 network protocols or fiber optic connectors for the SONET OC3 network protocol.

The network interface section 30 serves to initially demultiplex a synchronous network signal received from the network to a plurality of synchronous signals having lower data rates relative to the network signal received at its input.

II. SMC Section

The SMC section 50 extracts asynchronous signals or "payloads" from the plurality of synchronous signals received from interface section 30 over a network interface signal bus 37. The SMC section 50 circuitry resides on a single printed circuit card and includes bus interface circuitry 52, a payload segmentation sub-section 54, a payload re-assembly sub-section 92, control and management memory and circuitry 130b, and processor signal bus interface circuitry 108. Segmentation sub-section 54 includes a framer stage 56, a payload synchronization stage 140 and a payload multiplexer stage 160. Re-assembly sub-section 92 includes demultiplexer stage 106, asynchronous recovery stage 100, and framer stage 94.

The processor bus interface circuit 108 includes buffers to ensure real-time switch over required for automatic protection switching (APS). The buffers provide storage for the present frame of data while the previous frame is processed, the buffer ensures that the present frame is not lost during the switch over interval. The control and management memory and circuitry 130b, communicates with corresponding control and management circuits 130a in the network interface section 54 and 130c in the processor section 110 to facilitate control of the network interface section, SMC section, and the processor section via the control bus 55 that resides on the backplane. The control and management memory and circuitry module 130b includes programmable hardware such as FPGA which permits dynamic configuration of the SMC section 50 in accordance with network performance parameters, or through operator supplied modifications. Persons skilled in the art will be able to determine the appropriate programmable device for a particular technology since the selection will be dependent on the various protocol technologies used in the communication networks.

III. Signal Processing Section

Processor section 110 operates to process the asynchronous signals extracted by SMC section 50 and passed to processor section 110 over a processor signal bus 111. The processor section 110 circuitry resides on a single printed circuit card that includes the processor signal bus interface circuitry 112, finite state machine (FSM) pattern detector processor circuitry 114, signal processing circuitry 128, and control and management memory and circuitry 130c. The FSM pattern detection circuitry 114 is implemented in Random Access Memory (RAM) so that it can be configured through the control and management memory and circuitry 130c. The control and management memory and circuitry 130c connects to the SMC card via the control bus 55 on the backplane and is programmable as described above.

Operation of the SMC Module

I. Network Interface Section

The network interface 30 bus interface circuitry 36 includes the circuitry that permits demultiplexing input signals to provide lower speed signals for transmission over the signal bus 37 to the SMC section 50. The network interface 30 bus interface circuit 36 includes buffers to ensure real time switch over required for automatic protection switching (APS). The network interface signal bus 37 connects the network interface 30 and the SMC section 50 of module 22 over a high speed backplane (not shown). The control and management memory and circuitry 130a connects to the SMC section 50 through control bus 55 on the backplane.

In connection with an embodiment of the network interface section 30, consider a SONET Optical Carrier level 3 (OC-3) fiber optic connection. The line rate of the OC-3 signal is 155 Mbps. The bus interface circuitry demultiplexes the OC-3 signal into three Synchronous Transport Signal STS-1 signals each with line rates of 51.84 Mbps. Within each STS-1 signal, there is a DS3 signal with a line rate of 44.736 Mbps. The network interface section 30 provides in the case of OC-3 signals, three demultiplexed STS-1 signals to the SMC section 50 over the network interface bus interface circuitry 36. Off-the-shelf components are available which will accomplish the functions of the network interface section 30. Such components are preferably assembled on a single printed circuit card.

II. The SMC Segmentation Section

A. The Framing Stage

Figures 3A, 3B:
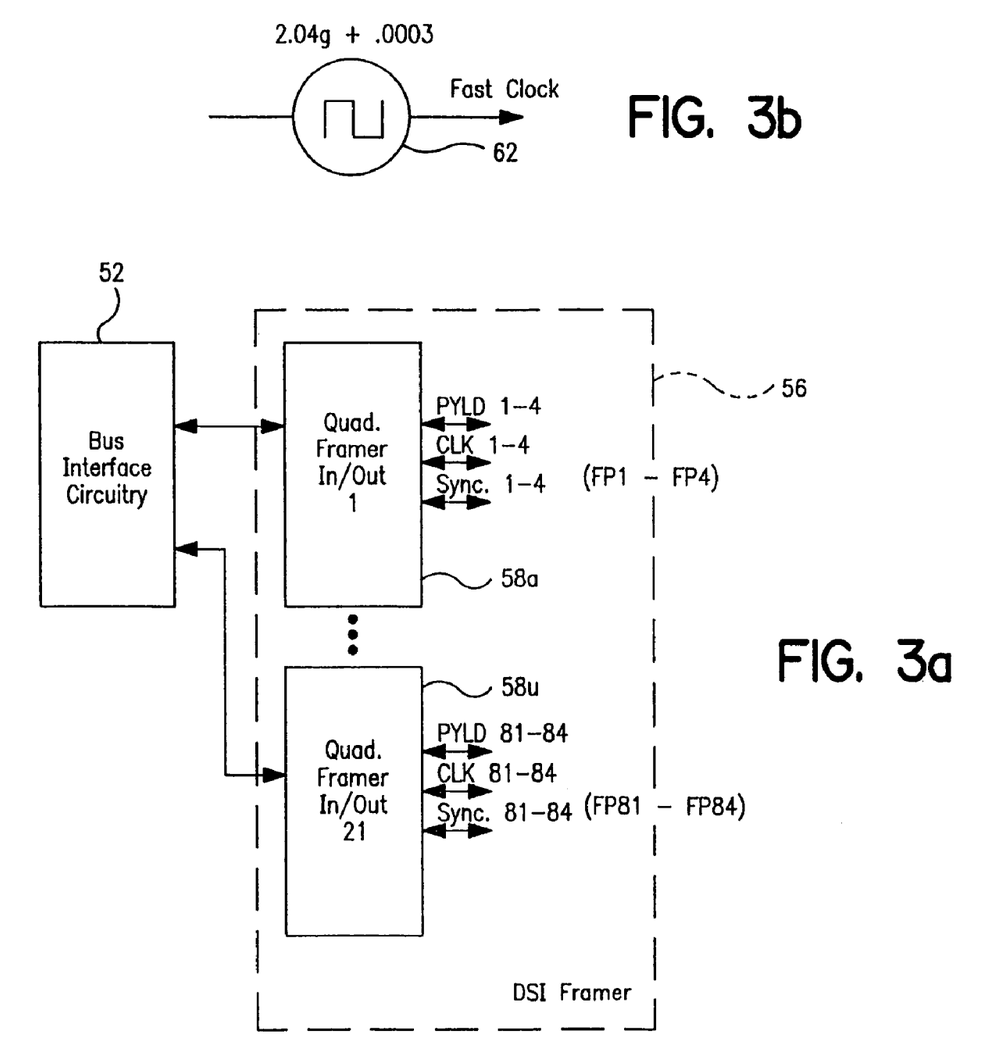

The SMC section 50 uses a "fast clock" signal to synchronize the plurality of asynchronous payloads passed from the interface section 30, such as DS3, T1 or E1 payloads, so that the signal processing section 110 can operate in a synchronous mode on the payloads. Referring now to FIG. 3b, the "fast clock" circuit oscillator 62 of SMC framer stage 56 is shown. The fast clock oscillator 62 generates a clock signal that is faster than the fastest payload clock of a set of payload clocks available through bus interface circuitry 52, thus ensuring that all payloads can be processed within the fast clock cycle. For the example of a T1 or E1 payload, a preferred clock rate would be 2.048±0.0003 Kilobits per second (Kbps). The fast clock oscillator 62 is reconfigurable through the network control and management software so that it can be adapted to different network operating conditions.

FIG. 3a shows the bus interface circuitry 52 and the DS1 framer stage 56. For the case of an OC-3 signal entering the network interface section 30, the interface section 30 provides STS-1 signals across the network interface signal bus to the bus interface 52 circuitry. In the embodiment shown, the bus interface circuitry 52 of SMC section 50 includes a SONET/SDH mapper to DS3/E3 and an M13 DS3 to DS1 demultiplexer/multiplexer, both of which are off-the-shelf devices. The output of the M13 circuit is 84 asynchronous DS1 signals. Those signals pass, in groups of four, into the DS1 framer circuit 56 which provides individually framed DS1 payloads (PYLD1-PYLD84) along with their respective clock and Frame Pulse (FP1-FP84). Preferably, DS1 frame circuit 56 is configured to include 21 quad framers 58a-58u for processing groups of four DS1 signals into individually framed DS1 payloads along with their respective clock and frame pulses.

B. Payload Synchronization Stage

Figure 4:
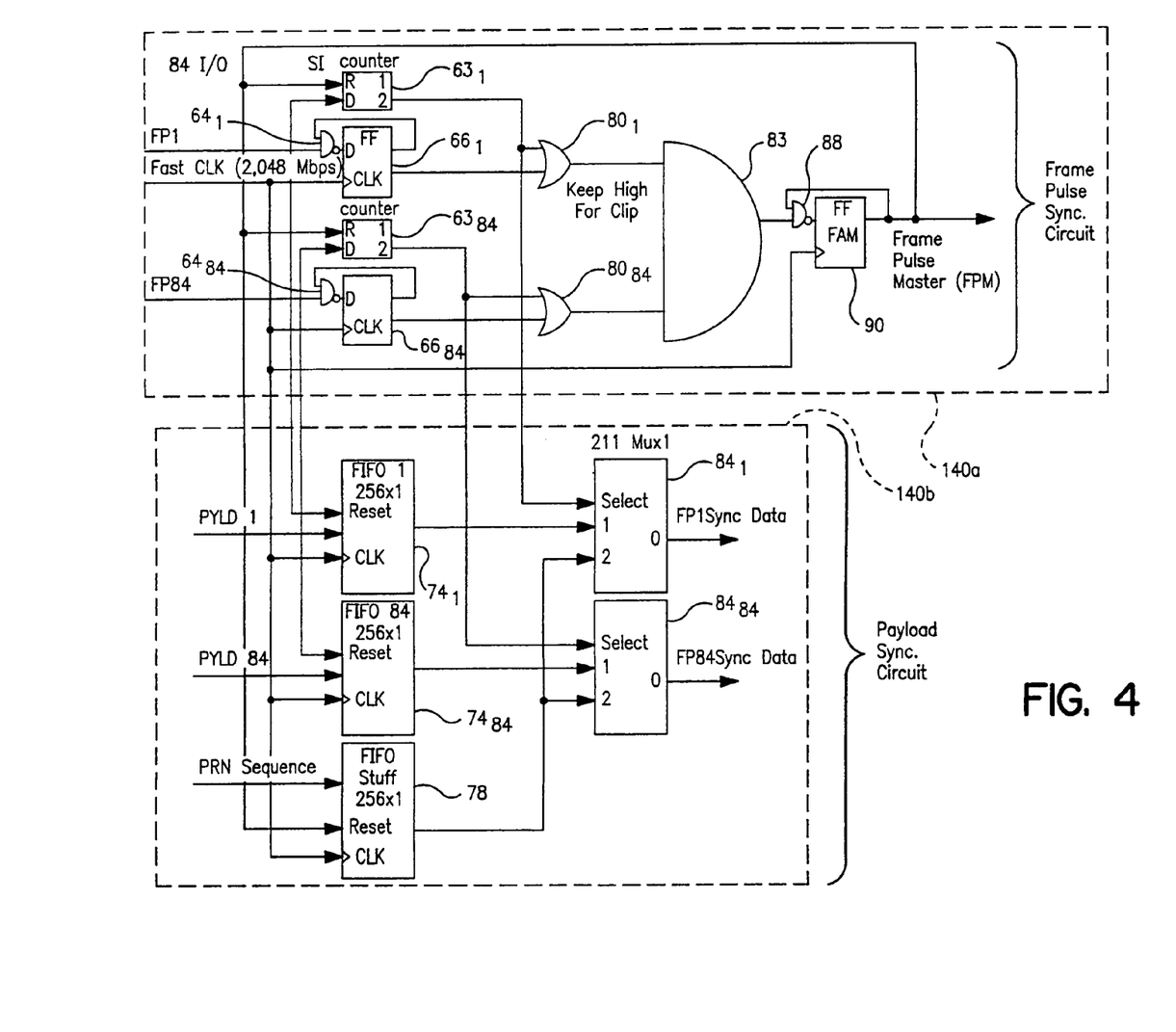
FIG. 4 is a schematic diagram of the frame pulse and data synchronization stage 140 of the circuit shown in FIG. 2.

Referring now to FIG. 4, the frame pulse subsection 140a and payload synchronization subsection 140b of the SMC synchronization stage 140 are shown. The function of subsections 140a and 140b is to provide a single synchronized master frame pulse (FPM), and to provide synchronized payloads, which in the case of OC-3 would be DS1 payloads. In frame pulse subsection 140a, the frame pulse synchronization function is accomplished by sending each individual frame pulse into respective flip flops $66_1$ to $66_{84}$ where it is clocked in by the "fast clock" 62. The input to each flip-flop $66_1$ to $66_{34}$ having a corresponding NAND gate $64_1$-$64_{84}$. The dual inputs of NAND gates $64_1$-$64_{84}$ supplied by the corresponding frame pulse $FP_n$ and the previous output of an associated flip flops $66_n$. The output of each flip flop enters an OR gate $80_1$-$80_{84}$ where it is combined with the output of a corresponding counter $63_1$-$63_{84}$, the "Frame Stuff Indicator" ($SI_n$) signal. The SI signal is generated by each 2-bit counter $63_n$, which increments each time its respective FP signal occurs. Each counter is reset by the output of an FPM flip flop 90. The output of the FPM flip flop 90 is derived by inputting the outputs of all of the OR gates $80_1$-$80_{34}$ together at AND gate 83. When all FP signals have occurred, the output of AND gate 83 is driven to a logic high state. The output of the FPM flip flop 90 resets all the 2-bit counters $63_1$-$63_{84}$. Whenever a second FP signal for an individual DS1 occurs prior to the generation of the FPM signal, then the respective counter outputs an SI signal.

The payload synchronization subsection 140b functions by sending each payload (PYLDN) to a 256-by-1 FIFO $74_1$-$74_{84}$ which are each clocked by the "fast clock" 62. The depth of each of these FIFO's is sufficient to accommodate the length of a payload frame, in the OC-3 embodiment, a DS1 frame. For the case of an OC-3 signal at the input to the interface section 30, there would exist 84 such FIFO's. One additional FIFO 78, called the Stuff FIFO, stores a pseudo-random number (PRN) pattern. The PRN pattern is generated from a deterministic recursive formula. The PRN characteristic pattern is used in place of "zero" bit stuffing techniques because "zero" bits are sometimes used as data sequences in asynchronous payloads. The outputs of the 84 payload FIFOs drive 2:1 multiplexers $84_1$-$84_{84}$ (muxes). The second input to those muxes is the output of the Stuff FIFO 78. If the SI signal bit from frame pulse synchronization subsection 140a is active, then the Stuff FIFO 78 output is selected and the stuff bit sequence is passed to the muxes. The multiplexer outputs FPLSYNCDATA-FP84SYNCDATA are passed to the signal processor section 110 through processor bus interface circuit 108 (FIG. 2). Otherwise, the DS1 payload is passed to the muxes $84_1$-$84_{84}$ and then to processor section 110 through processor bus interface section 108. Each payload is now synchronized to the fast clock 62.

C. The Payload Multiplexer/Demultiplexer Stage

Figure 5:
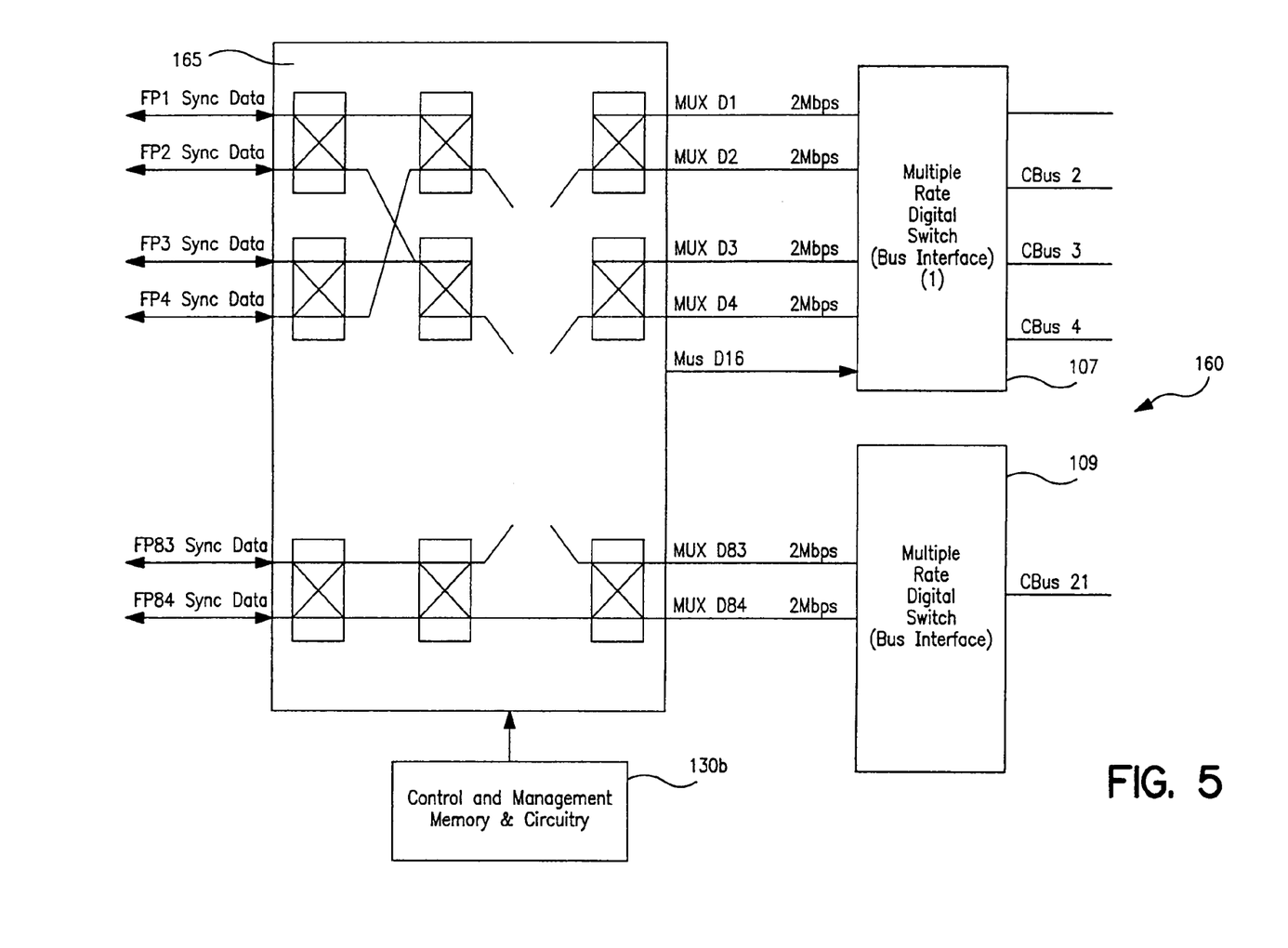
FIG. 5 is a schematic diagram of the multiplexer/demultiplexer stage 160 of the SMC shown in FIG. 2.

FIG. 5 shows a circuit diagram of the SMC multiplexer/demultiplexer stage 160. This circuitry includes a programmable crosspoint switch 165 that permits the connection of any payload path at the switch input to any switch output via processor signal bus interface circuitry section 108. For the case of an OC-3 signal from the interface section 30, the crosspoint switch 165 is embodied as an 84 by 84 contact switch. Such a device permits any of the 84 payload inputs to be switched to any of 84 different output paths. The input signal to output signal path is determined by the control and management circuitry 130b. The output of the crosspoint switch is input to a bank of multiple rate digital switches that each combine four payloads at 2.048 Kbps into a higher speed signal at 8.192 Kbps for transmission over the processor signal bus 111 through processor bus interface circuitry section 108. The multiple rate digital switch thereby reduces the number of signal lines on the backplane by a factor of 4. For the case of an OC-3 signal from the interface section 30, the signal processor bus width is reduced from 84 lines at 2.048 Kbps to 21 lines at 8.192 Kbps.

III. The Processor Section

A. The FSM Pattern Detector

Figure 6:
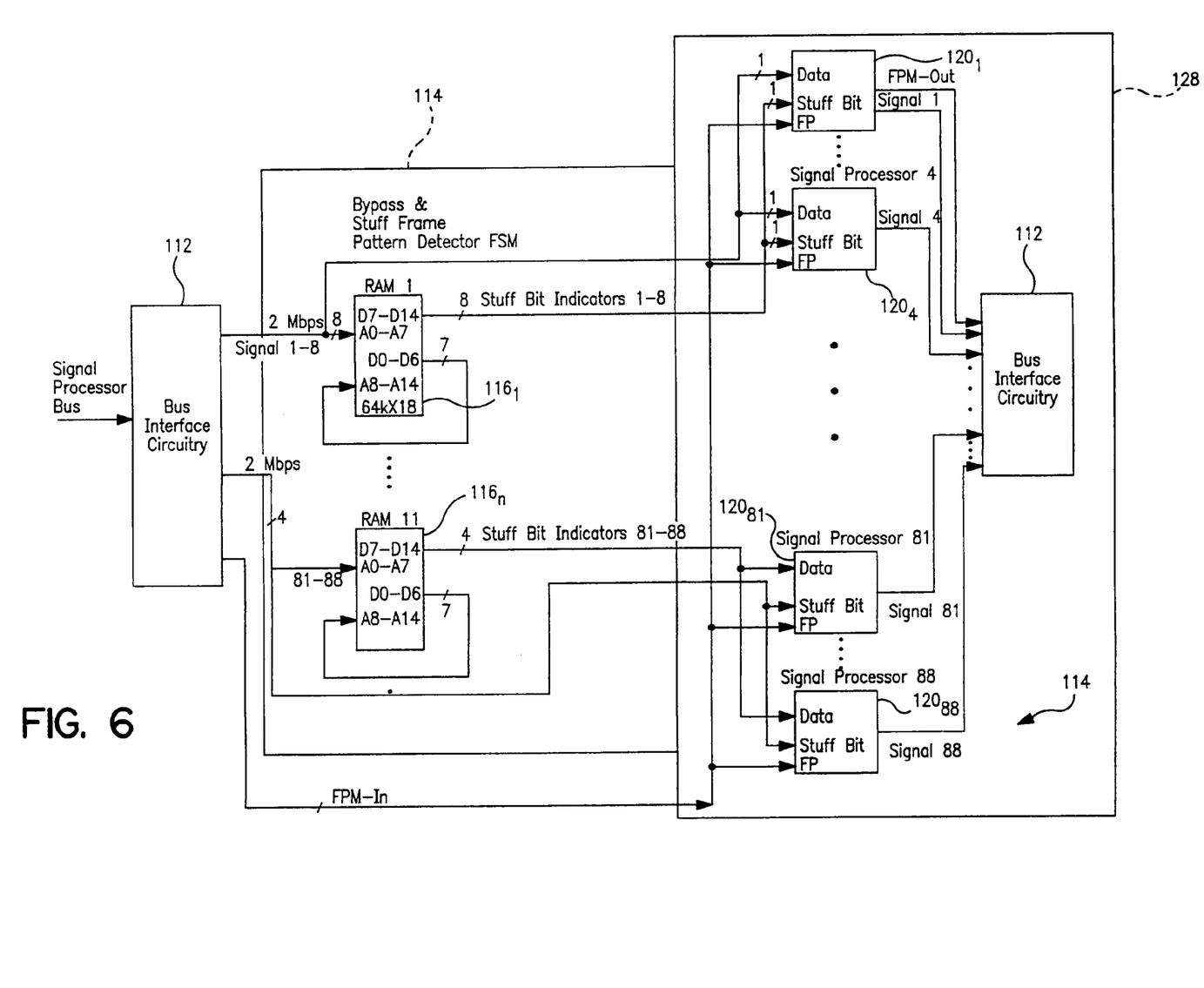
FIG. 6 is a schematic diagram of the Bypass and Stuff Frame Pattern Detector stage 114 of the processor element shown in FIG. 2.

FIG. 6 shows a circuit diagram of Bypass and Stuff-Frame Pattern Detector stage 114 and Signal Processing stage 128 of the signal processing section 110. The signal processor bus 111 interfaces with the processor section 110 via the processor signal bus interface circuitry 112. The processor signal bus interface circuitry 112 includes a multiple rate digital switch with the reverse function of that on the SMC section 50. The processor section multiple rate digital switch separates each 8.192 Kbps signal into four 2.048 Kbps signals). Each of the 2.048 Kbps DS1 payloads is passed to a signal processor $120_1$-$120_n$ and to a respective stuff frame pattern detector RAM $116_1$-$116_n$. The pattern detector RAM $116_n$ checks each DS1 frame for the PRN frame stuff pattern using Finite State Machine (FSM) Detection techniques. A set of the FSM state variables are assigned so that each state variable value can be stored as a code word in the pattern detector or "recognizer" RAM $116_1$-$116_n$. The state variables are dynamically reconfigured through control and management memory circuitry 130c. If a pattern detector RAM $116_n$ detects a stuff-bit pattern for any of the frames, a stuff-bit indicator is output from that RAM and passed onto the corresponding signal processor $120_n$. The signal processor will ignore frames for which the stuff bit indicator is active. Otherwise, it will perform the desired processing algorithm on the data signals. The signal processors $120_n$ output the appropriately processed signals together with the corresponding FPM signal to the processor signal bus interface circuitry 112. Given the payload data, the stuff bit indicator, and the FPM, all signal processors can process each non-stuffed frame synchronously with each other and ignore all stuffed frames. In a preferred embodiment, the processing function is echo cancellation, and the signal processors $120_1$-$120_{88}$ would be respective echo cancellation circuits.

The pattern detector RAM's $116_1$-$116_n$ process several inputs in parallel during a single clock cycle or "epoch" via a RAM SSA (Secondary State Assignment) look-up table such that a distinct code word is assigned for each FSM state. The payload input is provided to address lines A0-A7 of RAM modules $116_1$-$116_n$ to access a first data location. The address lines A8-A14 are fed-back from RAM output lines D0-D6 outputting the first data location for concatenation with the address lines A0-A7 forming a composite address across lines A0-A14 to access a second data location or "secondary state". The RAM feedback represents the encoded value of the next state. The pattern detector indicator signal is the stuff bit indicator, i.e., the high order bits of RAM's $116_1$-$116_n$, lines D7-D14. The number of feedback bits coming from the RAM $116_1$-$116_n$ depends on the total number of states in the recognizer FSM's to be implemented.

IV. The SMC Asynchronous Re-Assembly Circuitry

Figure 7:
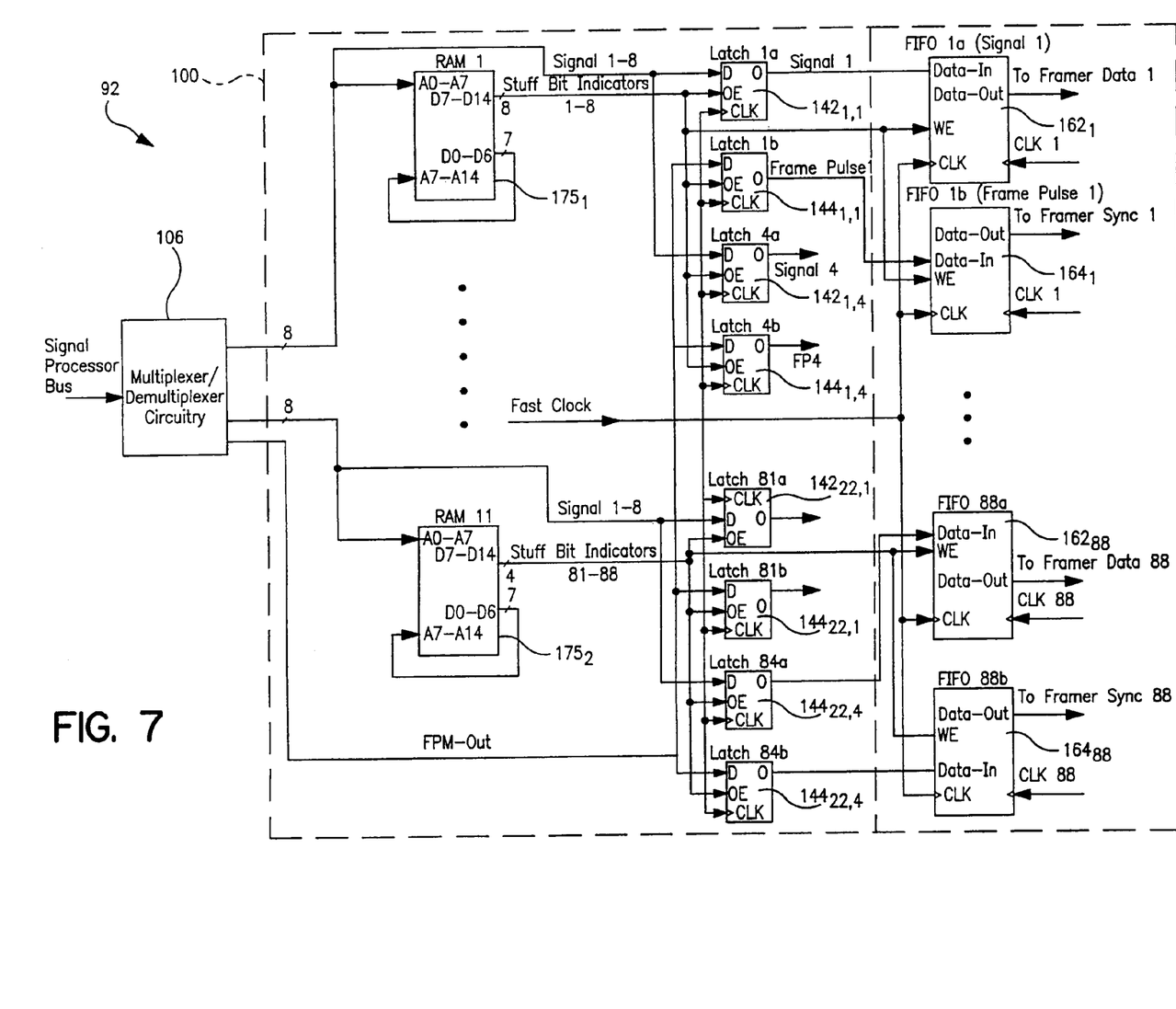
FIG. 7 is a schematic diagram of the asynchronous reassembly circuit 92 shown in FIG. 2.

Referring now to FIG. 7, there are two stages of the SMC asynchronous re-assembly stage 92, the demultiplexer stage 106 and the asynchronous recovery stage 100. The function of those circuits is to take the synchronous, processed payloads and restore their original asynchronous relationships. Subsequent to the signal processing operation, payloads are returned to the SMC section 50 for re-assembly into synchronous signals by re-assembly sub-section 92. The processed payloads pass first into the demultiplexer circuitry 106. The demultiplexer circuitry places each payload onto its original DS1 path. Each of the 84 DS1 signals are passed to a set of four latches $142_{n,m}$ (n=1 to 22, m=1 to 4) and a stuff bit sequence detector RAM $175_n$. By using the time transformed FSM algorithm described above, to detect the stuff bit sequence the number of individual RAM's required is reduced by a factor of 4 for this embodiment. For each DS1 payload in which the stuff bit detector RAM $175_n$ detects the stuff sequence, the RAM outputs a stuff bit indicator. The stuff bit indicator serves as the output enable (OE) for the latches $142_{n,m}$ that hold the DS1 payload frames. If the stuff bit indicator is active, then the respective latches will not be output enabled, and the respective frame and frame pulse will not pass to the respective DS1 data FIFO $162_n$ (n=1 to 88). If the stuff bit indicator is not active, then the latches for the respective DS1 payload frames are output enabled, and the DS1 frames pass to their respective DS1 FIFO's $162_n$. Each DS1 data frame is clocked into its respective DS1 FIFO using the fast clock.

The DS1 frame pulses (FPM-Out) are passed from demultiplexer 106 to sets of latches $144_{n,m}$ (n=1-22, m=1-4). The latches $144_{n,m}$ receive the FPM-out signals and use the stuff bit indicator as the output enable signal. If the stuff bit indicator is active, then the latch will not be output enabled, and the respective FPM-out signal will not pass into the respective Frame Pulse FIFO $164_n$ (n=1-88). If the stuff bit indicator is not active, then the latch for the respective Frame Pulse signal is output enabled, and the frame pulse passes into its respective Frame Pulse FIFO. Each Frame Pulse is clocked into its respective Frame Pulse FIFO using the fast clock.

The asynchronous timing relationship between the DS1 signals and the synchronous relationship between each DS1 signal and it respective frame pulse signal is restored by using the original DS1 clock to clock the output of each DS1 FIFO and its associated Frame Pulse FIFO. The outputs of the DS1 FIFOs and Frame Pulse FIFOs pass to quad DS1 framers, to the M13 DS3 to DS1 multiplexer, and then to the SONET/SDH mapper to DS3/E3, of the SMC section 50 network interface signal bus interface circuitry 52. The network interface section 30 receives the re-assembled STS-1 signals and places them into the desired physical format for transmission onto the communications network. One such format could be OC-3 format for SONET networks with transmission rates of 155 Mbps, as has been the case for the examples describe previously herein. Note that the physical network over which the processed data are transmitted need not be the same as that of the original data. For example, rather than transmitting the processed data over a SONET OC-3 network, the data could be transmitted over a coaxial DS3 network or over a PCS wireless network.

Additionally, while the present technique has been described in connection with the processing of SONET hierarchical signals it should be appreciated that the principles of the invention are generally applicable to known data formats as configurable by the control and management software. It should also be appreciated that various functional components of the invention may be implemented as analog-electric circuits, application-specific circuits, or preferably, as one or more appropriately-programmed logic circuits. Moreover, it should be appreciated that appropriately-programmed logic circuits such as Field Programmable Gate Arrays (FPGA's) are dynamically configured in response to management and control software such that the number utilized as tools of description herein are not to be construed as a limitation on the variety of applications for which this invention can be used.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed.

That which is claimed is:

1. A method of processing a synchronous telecommunications signal in a telecommunications network, the method comprising:
    extracting asynchronous payload signals from the synchronous telecommunications signal, each asynchronous payload signal having a data rate;
    sequentially framing the asynchronous payload signals with a corresponding clock pulse and framing pulse;
    synchronizing the sequentially framed asynchronous payload signals together at a data rate higher than the data rates of the asynchronous payload signals;
    processing the synchronized payload signals;
    restoring asynchronous relationships to the processed payload signals; and
    combining the restored payload signals into a second synchronous telecommunications signal.

2. A method as in claim 1 wherein synchronizing the sequentially framed asynchronous payload signals includes multiplexing the sequentially framed asynchronous payload signals.

3. A method as in claim 1 further comprising:
    generating stuff-bit frames to combine with the frames of the asynchronous payload signals.

4. A method as in claim 3 wherein synchronizing the sequentially framed asynchronous payload signals includes:
    combining the stuff-bit frames and the frames of the sequentially framed asynchronous payload signals to form the synchronized payload signals; and
    generating a master frame pulse signal.

5. A method as in claim 4 wherein processing the synchronized payload signals includes:
    demultiplexing the synchronized payload signals; and
    separating the stuff-bit frames from the frames of the synchronized payload signals.

6. A method as in claim 1 wherein processing the synchronized payload signals includes performing any of data compression, echo cancellation, error correction coding, voice encryption/decryption, and data encryption/decryption.

7. A method as in claim 1 further comprising:
    generating stuffed payload frames among the frames of the synchronized payload signals, the stuffed payload frames having random stuff patterns for the identification of the stuffed payload frames from among the frames of the synchronized payload signals;
    identifying the stuffed payload frames from among the frames of the synchronized payload signals based on the random stuff patterns using a finite state machine configured in memory, the memory storing state transition tables for the finite state machine; and
    wherein processing the synchronized payload signals includes processing the frames of the synchronized payload signals not identified by the finite state machine as being stuffed payload frames.

8. A method as in claim 7 wherein the memory is random access memory.

9. A method as in claim 7 further comprising:
    identifying the stuffed payload frames from among the frames of the processed payload signals based on the random stuff patterns using a second finite state machine configured in memory, the memory device storing state transition tables for the second finite state machine; and
    wherein restoring asynchronous relationships to the processed payload signals includes restoring asynchronous relationships to the frames of the processed payload signals not identified by the second finite state machine as being stuffed payload frames.

10. A device for processing a synchronous telecommunications signal in a telecommunications network, the device comprising:
an extraction module to separate asynchronous payload signals from the synchronous telecommunications signal, each asynchronous payload signal having a data rate;
a framing module to sequentially frame the asynchronous payload signals from the extraction module with a corresponding clock pulse and framing pulse;
a synchronization module to synchronize the sequentially framed asynchronous payload signals from the framing module together at a data rate higher than the data rates of the asynchronous payload signals;
at least one data processor to process the synchronized payload signals from the synchronization module;
a reassembly module to restore asynchronous relationships to the processed payload signals; and
a multiplexer to combine the restored payload signals from the reassembly module into a second synchronous telecommunications signal.

11. A device as in claim 10 wherein the synchronization module is configured to multiplex the sequentially framed asynchronous payload signals.

12. A device as in claim 10 further comprising:
a stuffed frame generator to generate stuff-bit frames to combine with the frames of the sequentially framed asynchronous payload signals.

13. A device as in claim 12 wherein the synchronization module is configured to combine the stuff-bit frames and the frames of the sequentially framed asynchronous payload signals to form the synchronized payload signals, and wherein the synchronization module is further configured to generate a master frame pulse signal.

14. A device as in claim 13 wherein the at least one data processor is configured to demultiplex the synchronized payload signals and separate the stuff-bit frames from the frames of the synchronous payload signals.

15. A device as in claim 10 wherein the at least one data processor is configured to perform any of data compression, echo cancellation, error correction coding, voice encryption/decryption, and data encryption/decryption.

16. A device as in claim 10 further comprising:
a stuffed frame generator to generate stuffed payload frames among the frames of the synchronized payload signals, the stuffed payload frames having random stuff patterns for the identification of the stuffed payload frames from among the frames of the synchronized payload signals;
a finite state machine configured in memory to identify the stuffed payload frames from among the frames of the synchronized payload signals based on the random stuff patterns and on state transition tables stored in the memory; and
wherein the at least one data processor is configured to process the frames of the synchronized payload signals not identified by the finite state machine as being stuffed payload frames.

17. A device as in claim 16 wherein the memory is random access memory.

18. A device as in claim 16 further comprising:
a second finite state machine configured in memory to identify the stuffed payload frames from among the frames of the processed payload signals based on the random stuff patterns and on state transition tables stored in the memory; and
wherein the reassembly module is configured to restore asynchronous relationships to the frames of the processed payload signals not identified by the second finite state machine as being stuffed payload frames.

19. A device for processing a synchronous telecommunications signal in a telecommunications network, the device comprising:
means for extracting asynchronous payload signals from the synchronous telecommunications signal, each asynchronous payload signal having a data rate;
means for sequentially framing the asynchronous payload signals with a corresponding clock pulse and framing pulse;
means for synchronizing the sequentially framed asynchronous payload signals together at a data rate higher than the data rates of the asynchronous payload signals;
means for processing the synchronized payload signals;
means for restoring asynchronous relationships to the processed payload signals; and
means for combining the restored payload signals into a second synchronous telecommunications signal.

20. A device as in claim 19 further comprising:
means for generating stuffed payload frames among the frames of the synchronized payload frames, the stuffed payload frames having random stuff patterns for the identification of the stuffed payload frames from among the frames of the synchronized payload signals;
means for identifying the stuffed payload frames from among the frames of the synchronized payload signals based on the random stuff patterns;
wherein the processing means processes the frames of the synchronized payload signals not identified as being stuffed payload frames;
means for identifying the stuffed payload frames from among the frames of the processed payload signals based on the random stuff patterns; and
wherein the restoring means restores asynchronous relationships to the frames of the processed payload signals not identified as being stuffed payload frames.

* * * * *